US011383771B1

(12) United States Patent
Newcomb et al.

(10) Patent No.: US 11,383,771 B1
(45) Date of Patent: Jul. 12, 2022

(54) INTEGRATED FIBER-REINFORCED POLYMER VEHICLE RAIL-AND-PANEL STRUCTURES AND METHODS OF MAKING THE SAME

(71) Applicant: GM GLOBAL TECHNOLOGY OPERATIONS LLC, Detroit, MI (US)

(72) Inventors: Bradley A. Newcomb, Troy, MI (US); Julien P. Mourou, Bloomfield Hills, MI (US); Thomas S. Prevost, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/226,232

(22) Filed: Apr. 9, 2021

(51) Int. Cl.
  *B62D 29/00* (2006.01)
  *B62D 25/02* (2006.01)
  *B62D 25/06* (2006.01)

(52) U.S. Cl.
  CPC ........... *B62D 29/005* (2013.01); *B62D 25/02* (2013.01); *B62D 25/06* (2013.01)

(58) Field of Classification Search
  CPC ...... B62D 25/02; B62D 25/06; B62D 27/023; B62D 29/005; B62D 29/006; B62D 29/043; B62D 29/048
  USPC ............................. 296/23.01, 3, 29, 30, 210
  See application file for complete search history.

(56) References Cited

U.S. PATENT DOCUMENTS

| 4,159,144 A | 6/1979 | Ehlen et al. |
| 4,892,351 A | 1/1990 | Ono et al. |
| 8,925,286 B2 | 1/2015 | Hagen et al. |
| 8,926,004 B2 | 1/2015 | Betzen et al. |
| 9,227,672 B2 * | 1/2016 | Kim ..................... B62D 29/004 |
| 9,227,673 B2 | 1/2016 | Berger et al. |
| 9,290,084 B2 | 3/2016 | Bojanowski et al. |
| 9,340,096 B2 | 5/2016 | Bojanowski |
| 9,994,091 B2 | 6/2018 | Kaphengst et al. |
| 10,293,668 B1 | 5/2019 | Foss et al. |
| 2019/0146216 A1 | 5/2019 | Mourou et al. |

FOREIGN PATENT DOCUMENTS

| DE | 10218890 A1 * | 12/2003 | ......... B29C 44/1233 |
| DE | 102005010487 A1 * | 9/2006 | ......... B60R 13/0206 |

* cited by examiner

*Primary Examiner* — Dennis H Pedder
(74) *Attorney, Agent, or Firm* — Quinn IP Law (57) ABSTRACT

Presented are fiber-reinforced polymer (FRP) composite components for motor vehicles, methods for making and using such components, and motor vehicles with unitary FRP-composite vehicle roof rail-and-panel structures. A vehicle body structure for a motor vehicle includes one or more elongated support rails, each of which includes at least two contoured rail panels that are joined together to define therebetween an internal rail cavity. At least one of these contoured rail panels is formed with an FRP material. The vehicle body structure also includes a body panel that is formed with the same FRP material. The body panel includes a main panel section with one or more stepped interfaces that each projects transversely from a respective side of the main panel section and mounts thereon one of the contoured rail panels. The body panel and a contoured rail panel of each support rail are integrally formed as a single-piece, unitary structure.

20 Claims, 4 Drawing Sheets

INTEGRATED FIBER-REINFORCED POLYMER VEHICLE RAIL-AND-PANEL STRUCTURES AND METHODS OF MAKING THE SAME

INTRODUCTION

The present disclosure relates generally to body structures of motor vehicles. More specifically, aspects of this disclosure relate to polymer composite vehicle pillars, rails, panels, and windows for simplified assembly and improved crush performance.

Most current production motor vehicles, such as the modern-day automobile, are erected on a rigid vehicle body—either as a body-on-frame or a unibody construction—with an interior passenger compartment that seats and safeguards the vehicle occupants. Mounted between the forward A-pillars of the vehicle body is a windshield that provides an aerodynamically formed window through which the driver views the roadway while preventing unwanted ingress of wind, rain, and debris. Driver-side and passenger-side door assemblies are movably mounted between the A and B-pillars (coupes) and B and C-pillars (sedans) to provide controlled access to the passenger compartment and enable lateral visibility through accompanying door windows. A rear window or back glass is mounted between the C-pillars (three-box body designs) or D-pillars (two-box body designs) to seal off, yet provide visibility through, a rearward end of the passenger compartment. To provide extra sunlight and optional ventilation for the passenger compartment, a transparent moonroof or sunroof panel may be fixedly or movably installed within the vehicle's roof structure.

Sunroof, moonroof, and hardtop roof configurations (referred to collectively as "roof assemblies") customarily define the upper extent of a motor vehicle's passenger compartment. Such roof assemblies generally include laterally spaced roof rails adjoining longitudinally spaced roof headers to collectively define the skeletal support structure of the roof. A roof panel fabricated from glass (moonroofs and sunroofs) or sheet metal (hardtops) is seated on or between the headers and rails and attached thereto, e.g., with adhesives, gaskets, and fasteners. Acting as an overhead canopy, the vehicle roof panel is sealed for weather proofing purposes and securely mounted to withstand the forces of high-speed winds created during all ranges of vehicle operation. Furthermore, the roof assembly may exhibit a low profile for minimal wind resistance, an aesthetically appealing appearance, and desired load-bearing characteristics for desired roof-crush performance.

SUMMARY

Presented herein are fiber-reinforced polymer (FRP) composite components for motor vehicles, methods for making and methods for using such components, and motor vehicles with unitary FRP-composite vehicle roof rail-and-panel structures. In an example, there are presented load-bearing FRP vehicle body components that are continuously integrated with locally transparent FRP panel components. A vehicle upper body structure, for example, is generally typified by a load-bearing roof structure mounted on a pillar array that provides subjacent support between the roof and a lower body portion of the vehicle. The pillar array includes a pair of front (A) pillars at a forward end of the passenger compartment, a pair of rear (C) pillars at a rearward end of the passenger compartment and, depending on vehicle body type, a pair of side (B) pillars interposed between the A and C-pillars. The roof structure is generally composed of laterally spaced side rails adjoining top ends of the pillars, and longitudinally spaced front and rear headers defining the upper extents of front and rear windshield frames. Opposing ends of the roof headers may be mounted to flanges or inboard surfaces of the side rails to cooperatively define a roof frame with a central opening. A transparent FRP composite roof panel may be mounted onto the roof frame to cover the central opening, e.g., for a panoramic "glass roof" automobile.

Load-bearing vehicle roof rails may each be fabricated as a tripartite construction from contoured inner and outer rail sections that are joined together, e.g., via welding, clamping, bonding, fastening, etc., to define a longitudinally elongated interior cavity. These two rail sections are mounted to a contoured base rail section, which is located inboard from the inner and outer rail sections and is integrally formed with the FRP roof panel. Effectively, the FRP roof panel may be integrally formed as a single-piece, unitary structure with two base rail sections, which project transversely from opposing lateral sides of a main panel section. Both base rail sections may be opaque, whereas the main panel section may be substantially transparent. A stepped interface region, which is interposed between and joins the main panel section to the base rail sections, may have a variable transparency that changes in a cross-car direction. Lateral widths of the base rail sections may vary (e.g., increase then decrease) along the fore-aft length of the vehicle body. A mounting flange of the outer rail section, to which the base rail section is joined, has a lateral width that may similarly vary along the fore-aft length of the vehicle body.

Attendant benefits for at least some of the disclosed concepts include continuous integration of an FRP structural member and a locally fiber-reinforced body structure with tailored local and global transparency for reduced part counts and increased compartment space. For automotive applications, unitary roof rail-and-panel constructions help to reduce system complexity, add occupant headspace, and increase occupant visibility by maximizing total daylight opening (DLO) area through the roof panel. Hollow roof rails may contain selectively located internal reinforcement features that provide local stiffening with limited additional vehicle mass to enable loading in a desired plane for optimal roof-crush performance. In addition to improving vehicle body integrity and occupant visibility, disclosed features may also help to reduce overall vehicle mass by decreasing upper body mass and, optionally, eliminating cross-car reinforcement bows, which in turn leads to improved fuel economy and increased vehicle range for hybrid-electric and full-electric vehicle applications.

Aspects of this disclosure are directed to FRP components for vehicle body structures. By way of example, a vehicle body structure for a motor vehicle includes one or more elongated support rails (e.g., roof rails, vehicle pillars, rocker panels, crossbeams, etc.) and a body panel (e.g., roof panel, fender panel, front and rear windshields, etc.). Each support rail includes two or more contoured rail panels that are joined together to define therebetween an internal rail cavity. At least one of these rail panels is formed, in whole or in part, from a FRP material. The body panel, which is also formed, in whole or in part, from the same FRP material, includes a main panel section with one or more stepped interfaces. Each stepped interface projects transversely from a respective side edge of the main panel section and mounts thereon one of the contoured rail panels. The body panel and a rail panel of each support rail are integrally formed as a single-piece, unitary structure.

Additional aspects of this disclosure are directed to motor vehicles equipped with load-bearing upper body structures having unitary FRP-composite vehicle roof rail-and-panel structures. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, e-bikes, e-scooters, etc. In an example, a motor vehicle includes a vehicle body with a passenger compartment, multiple road wheels mounted to the vehicle body, and other standard original equipment. A prime mover, which may be in the nature of an engine assembly (e.g., for internal combustion engine (ICE) powertrains), an electric traction motor (e.g., for full-electric vehicle (FEV) powertrains), or both an engine assembly and a traction motor (e.g., for hybrid electric vehicle (HEV) powertrains), selectively drives one or more of the road wheels to thereby propel the vehicle. Disclosed features may also be used in non-automotive applications.

Continuing with the discussion of the above example, the vehicle's upper body structure includes multiple support pillars that are attached to and project upwardly from the lower body structure. A driver-side (first) roof rail is mounted onto a port-side (first) set of the support pillars, whereas a passenger-side (second) roof rail is mounted onto a starboard-side (second) set of the support pillars, laterally spaced from the driver-side roof rail. The driver-side roof rail includes outer (first) and base (second) contoured rail panels that are joined together to define therebetween an internal rail cavity. Likewise, the passenger-side roof rail includes outer (third) and base (fourth) contoured rail panels that are joined together to define therebetween another internal rail cavity. Both of the base rail panels are formed with an FRP material. Also formed with this same FRP material is a body panel that includes a main panel section with stepped interfaces that project transversely from opposing side edges of the main panel section. The two stepped interfaces each mounts thereon a respective one of the outer rail panels. The body panel and the two base rail panels are integrally formed as a single-piece, unitary structure.

Other aspects of this disclosure are directed to manufacturing processes, control logic, and computer-readable media (CRM) for making or using any of the disclosed components, body structures, or vehicles. In an example, a method is presented for manufacturing a vehicle body structure for a motor vehicle. This representative method includes, in any order and in any combination with any of the above and below disclosed options and features: forming a first contoured rail panel of a first elongated support rail; forming, with an FRP material, a second contoured rail panel of the first elongated support rail; joining the first and second contoured rail panels together to define therebetween an internal rail cavity; forming a body panel with the FRP material, the body panel including a main panel section having a first stepped interface projecting transversely from a first side edge of the main panel section, wherein the body panel and the second contoured rail panel are integrally formed together as a single-piece, unitary structure; and mounting the first contoured rail panel onto the first stepped interface.

For any of the disclosed structures, vehicles, and methods, each support rail may further include an inner (third) con-toured rail panel that is sandwiched between and attached to the outer and base rail panels. In this instance, the inner and outer rail panels each includes a pair of outwardly projecting flanges; each flange of one rail panel is rigidly mounted to a respective flange of the other rail panel. As yet a further option, the base rail panel may be formed with an inboard panel segment projecting obliquely from an outboard panel segment. In this instance, the inboard panel segment is integrally formed with the stepped interface, and the outboard panel segment mounts thereon the inner rail panel. In at least some applications, all of the contoured rail panels are formed from an FRP material. Alternatively, the inner and/or outer rail panels may be formed, in whole or in part, from a metallic material, such as stamped or hydroformed aluminum or steel sheet metal.

For any of the disclosed body structures, vehicles, and methods, the thickness of the roof panel's main panel section is substantially equal to the thickness of the outer rail panel's mounting flange that is attached to the stepped interface. Alternatively, the thickness of the main panel section may be equal to or greater than a total "stackup" thickness of a mating pair of the rail panel flanges that are stacked against and mounted to each other. As yet a further option, the upper surface of the outer rail panel's mounting flange may be substantially flush with the upper surface of the body panel's main panel section. Moreover, each stepped interface may extend continuously along the entire fore-aft length of the respective side edge from which it projects. Optionally, the body panel may be formed with an overhang section that projects transversely from the main panel section. In this instance, the outer rail panel's mounting flange is rigidly secured to the body panel and sandwiched between the stepped interface and the overhang section.

For any of the disclosed body structures, vehicles, and methods, the base rail panel is formed with obliquely angled inboard and outboard panel segments, where the inboard panel segment is integrally formed with the stepped interface. The lateral width of the outboard panel segment varies along the fore-aft length of the vehicle body structure. In this instance, the mounting flange of the outer rail panel, which mounts onto the stepped interface of the body panel adjacent outboard panel segment, has a lateral width that likewise varies along the fore-aft length of the vehicle body structure. Each stepped interface may have a variable opacity that changes in a transverse direction along a lateral width of the body panel. In this instance, the base rail panel may be substantially opaque whereas the main panel section may be substantially transparent.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features described above and below.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
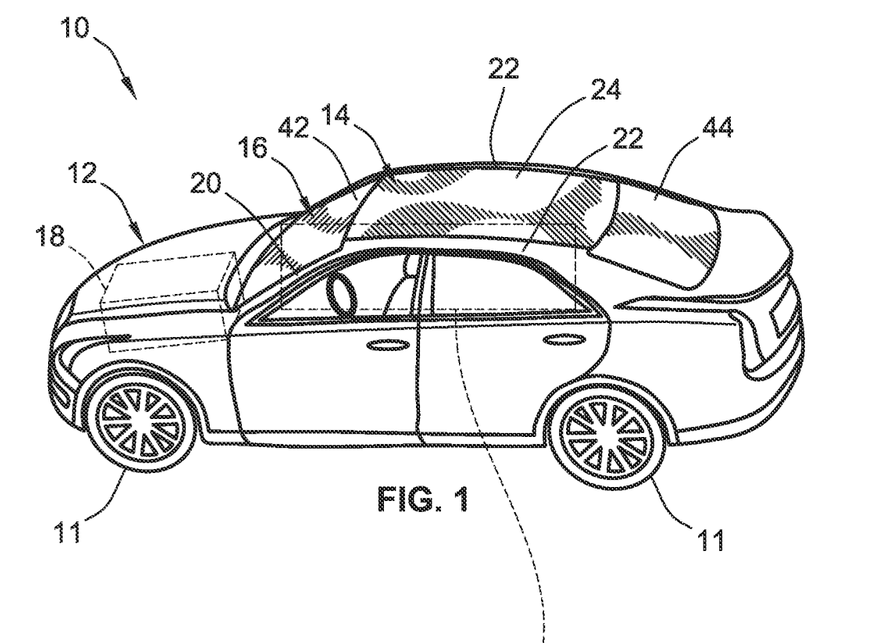
FIG. 1 is an elevated, perspective-view illustration of a representative motor vehicle with an upper body structure having a locally transparent roof panel integrally formed with opaque roof rails in accordance with aspects of the present disclosure.

Referring now to the drawings, wherein like reference numbers refer to like features throughout the several views, there is shown in FIG. 1 a perspective-view illustration of a representative automobile, which is designated generally at 10 and portrayed herein for purposes of discussion as a sedan-style passenger vehicle with a panoramic "glass roof" assembly. The illustrated automobile 10—also referred to herein as "motor vehicle" or "vehicle" for short—is merely an exemplary application with which novel features of this disclosure may be practiced. In the same vein, incorporation of the present concepts into the roof rails and roof panel of the vehicle's upper body structure should also be appreciated as an exemplary implementation of the novel concepts disclosed herein. As such, it will be understood that aspects and features of the present disclosure may be applied to other vehicle body components, may be incorporated into any logically relevant type of motor vehicle, and may be implemented for automotive and non-automotive applications alike. Moreover, only select components of the motor vehicle and vehicle body structures are shown and described in additional detail herein. Nevertheless, the vehicles and vehicle structures discussed below may include numerous additional and alternative features, and other available peripheral components, for carrying out the various functions of this disclosure.

Automobile 10 of FIG. 1 includes a vehicle body 12 that is erected on a rigid vehicle frame 20, for example, as either a body-on-frame or a unibody construction in a three-box configuration. Front and rear road wheels 11 are operatively attached to the vehicle frame 20, e.g., via individual suspension and corner subassemblies. In order to propel the vehicle, the road wheels 11 are driven by a prime mover 18, which may be in the nature of an internal combustion engine assembly and/or one or more electric traction motors. Located aft of a forward compartment (e.g., engine bay) and forward of a rear compartment (e.g., vehicle trunk) is a passenger compartment 16 of the vehicle body 12 that seats and safeguards the vehicle occupants. While shown as a sedan-type passenger vehicle with a three-box configuration, it should be appreciated that the vehicle 10 may take on innumerable vehicle types and vehicle-body configurations.

A rigid roof structure 14 generally delimits the upper extent of the passenger compartment 16, shielding the driver and passengers from rain, snow, ultraviolet (UV) light, and other elements. In accord with the illustrated example, the roof structure 14 is generally composed of laterally spaced roof rails 22 that are interconnected with longitudinally spaced roof headers 38 and 40 (see inset view). The roof rails 22 and roof headers 38, 40 cooperatively provide subjacent support for a roof panel 24, which may be optically transparent, translucent, opaque, or combinations thereof. The roof structure 14, including the rails 22, headers 38, 40, and roof panel 24, extends over and across the upper boundary of the passenger compartment 16. As illustrated, the transparent roof panel 24 has a "panoramic" design in that it spans across the entire fore-aft length of the vehicle roof and, thus, provides vehicle occupants with a predominantly unobstructed view through the top of the vehicle 10.

Inset within FIG. 1 is an enlarged, side-view illustration of a driver-side portion of the vehicle passenger compartment 16 shown with the vehicle doors removed to provide a more detailed look at a section of the vehicle's load-bearing upper body structure 30. The upper body structure 30 is represented in FIG. 1 by a rearwardly projecting front (A) pillar 32 at a forward end of the passenger compartment 16, a forward-leaning rear (C) pillar 36 at a rearward end of the passenger compartment 16, and a generally vertical side (B) pillar 34 interposed between the A-pillar 32 and C-pillar 36. Although not visible in the views provided, each pillar 32, 34, 36 includes a mirrored counterpart that is located on the starboard side of the vehicle passenger compartment 16 such that the body structure 30 includes six support pillars. These vehicle pillars 32, 34, 36 buttress roof structure 14 on a lower body portion of the vehicle 10 (e.g., rockers, hinge pillars, bulkhead, quarter panels, etc.). For instance, A-pillar 32 connects from a lower hinge pillar 46, just above the front cowl (not shown), and extends in an aftward direction and couples to the roof rail 22. Alternative vehicle body architectures may eliminate the B-pillars 34 (e.g., for coupe-style passenger vehicles) or may include multiple side pillars (e.g., B1, B2, etc., for limousines) or a D-pillar (e.g., for sport utility vehicles and station wagons).

In addition to the rectangular array of support pillars 32, 34, 36, the upper body structure 30 of FIG. 1 is further typified by laterally spaced roof rails 22 and longitudinally spaced headers 38 and 40. The roof rails 22 are located on port and starboard sides of the passenger compartment 16 and longitudinally elongated along the fore-aft length of the vehicle 10. Located at forward and rearward ends of the roof structure 14 are the front and rear headers 38 and 40, respectively, which extend transversely across the lateral width of the roof 14. Optional cross-car reinforcement bows (not shown) may be included for supporting a standard roof panel or, conversely, may be eliminated from the roof structure 14 for supporting a panoramic "glass roof" panel. The front header 38 cooperates with the two A-pillars 32 and a front cowl panel (not shown) to define a front window frame that operatively supports thereon a front windshield 42. At the opposite end of the passenger compartment 16, the rear header 40 cooperates with the two C-pillars 36 and a rear deck panel (not shown) to define a rear window frame that operatively supports thereon a rear windshield 44. Despite not being visible in FIGS. 2-4, disclosed vehicle roof structures include both port-side and starboard side roof rails, which are mirrored structural counterparts, as indicated above with respect to roof rails 22 of FIG. 1.

Discussed below are representative examples of vehicle body structures with load-bearing fiber-reinforced polymer (FRP) components that are continuously integrated with FRP panel members. It is envisioned that the load-bearing FRP components may take on various apposite constructs, including roof rails, chassis rails, vehicle pillars, rocker panels, crossbeams, etc. For an FRP-composite vehicle roof rail-and-panel structure, each roof rail may be a bipartite or tripartite construction that is fabricated with one or more thermoset carbon-fiber reinforced polymer (CFRP) roof rail panels. The assembled roof rail may be structurally reinforced with localized polymer foam or honeycomb core inserts to improve vehicle noise, vibration, and harshness (NVH) performance while optimizing roof-crush performance. Additional information regarding locally reinforced, selectively transparent FRP roof rails can be found, for example, in commonly owned U.S. patent application Ser. No. 17/152,965, to Bradley A. Newcomb, et al., which was filed on Jan. 20, 2021, and is incorporated herein by reference in its entirety and for all purposes.

In the same vein, the FRP panel members may take on numerous optional forms, including roof panels, fender and quarter panels, front and rear windshields, quarter and vent windows, etc. For a panoramic moonroof application, the FRP panel member may be a transparent composite roof panel with a laminated, sandwich-type construction with orthotropic properties and load path optimization enabled by localized FRP reinforcement features. The structural integrity and overall level of optical transparency of the composite panel may be controlled by the contents and arrangement of reinforcing fibers incorporated into an FRP layer or layers within the panel's multilayer construction. Additional information regarding laminated, sandwich-type transparent FRP roof panels can be found, for example, in commonly owned U.S. patent application Ser. No. 17/141,524, to Bradley A. Newcomb, et al., which was filed on Jan. 5, 2021, and is incorporated herein by reference in its entirety and for all purposes. Integration and joining of fiber reinforced structures and glazing structures in this manner enables a total part reduction and minimization of adhesives and fasteners while eliminating visible seams and height differences between the integrated components.

Optical transparency characteristics for disclosed FRP composite components may be governed by the localized application of fibers within select regions of the unitary structure. For instance, a first FRP region of a FRP composite component (e.g., a contoured roof rail panel section) may contain a first total fiber volume percentage, whereas a second FRP region (e.g., roof panel section) has a second total fiber volume fraction that is markedly less than that of the first region. In a specific example, the first region has a fiber volume percent of at least 40 vol %; the fibers may be arranged in a continuous fiber sheet that is coterminous with the first region so as to allow little or no light to pass therethrough (e.g., total transmittance of less than about 2% to 10%). Conversely, the second region may have a fiber volume percent of less than 20%; the fibers may be localized to select discrete regions such that a majority of the second region may provide a high transparency (e.g., total transmittance of at least about 85%). A third interface region that extends between and connects the first and second regions may have a third total fiber volume fraction that is between the first and second fiber total fiber volume fractions. The fibers within the third region may be arranged, e.g., in a square lattice pattern, such that the total transmittance increases in the transition from the first region to the second region.

It may be desirable, e.g., for laminated, sandwich-type panel constructions, that only one or more select layers of FRP material within a panel's mixed layer stackup may be fully integrated with a load-bearing FRP component. Likewise, it may be desirable, e.g., for bipartite or tripartite load-bearing FRP rails, that only one or more select pieces of a rail's multipiece assembly may be fully integrated with the FRP panel member. As yet a further option, all three of the FRP regions may contain the same type of reinforcing fibers, which may include carbon fibers, glass fibers, basalt fibers, Kevlar fibers, combinations thereof, etc.; alternatively, a region may contain a distinct fiber composition. Moreover, the type of fiber reinforcement may be mixed such that a primary fiber reinforcement (e.g., carbon fibers) contributes at least about 60 vol % of a total fiber volume percentage in the first region and at least about 10 vol % of the total fiber volume percentage in the second region.

Similar to the fiber contents, all three of the FRP regions may contain the same polymer matrix, which may include epoxies, polyesters, acrylics, cast acrylics, polycarbonates, polyurethanes, aliphatic polyurethanes, cast polycarbonates, nylons, combinations thereof, etc. In a more specific example, a roof panel and adjoining side rail panels may be formed from a hybrid injection-compression molding process from one or more copolymers in which a mass fraction of a thermoplastic polymer (e.g., acrylic or polycarbonate) is greater than about 50 weight percent (wt %) of the polymer molecular weight. Fiber orientation, color, thickness, length, etc., may all be dependent upon application-specific structural requirements as well as aesthetic design. Color may be controlled by fiber selection, such as metallic coated carbon fiber, or may by index of refraction matched fibers to create transparent/translucent patterns.

Turning next to FIGS. 2-5, wherein like reference numbers are used to designate the same or similar components, there are shown three representative examples of FRP-composite vehicle roof rail-and-panel structures, respectively designated at 114, 214 and 314. Although differing in appearance, it is envisioned that any of the features and options described below with reference to the vehicle roof structure 114 of FIG. 2 can be incorporated, singly or in any combination, into the roof structures 214, 314 of FIGS. 3 and 4, and vice versa. By way of non-limiting example, all three of the illustrated vehicle roof structures 114, 214, 314 include an integral body panel, represented by rigid roof panel 124, 224 and 324, that extends between and interconnects with a pair of elongated support rails, represented herein by rigid roof rails 122, 222 and 322. As mentioned above, only a single driver-side roof rail is shown in each view; notwithstanding, each roof structure 114, 214, 314 is fabricated with a complementary passenger-side roof rail that is a mirrored counterpart to the one shown in the Figures. For purposes of succinctness and efficiency, both the driver-side and passenger-side roof rails may be described below with respect to the illustrated roof rail 122, 222, 322.

Figure 2:
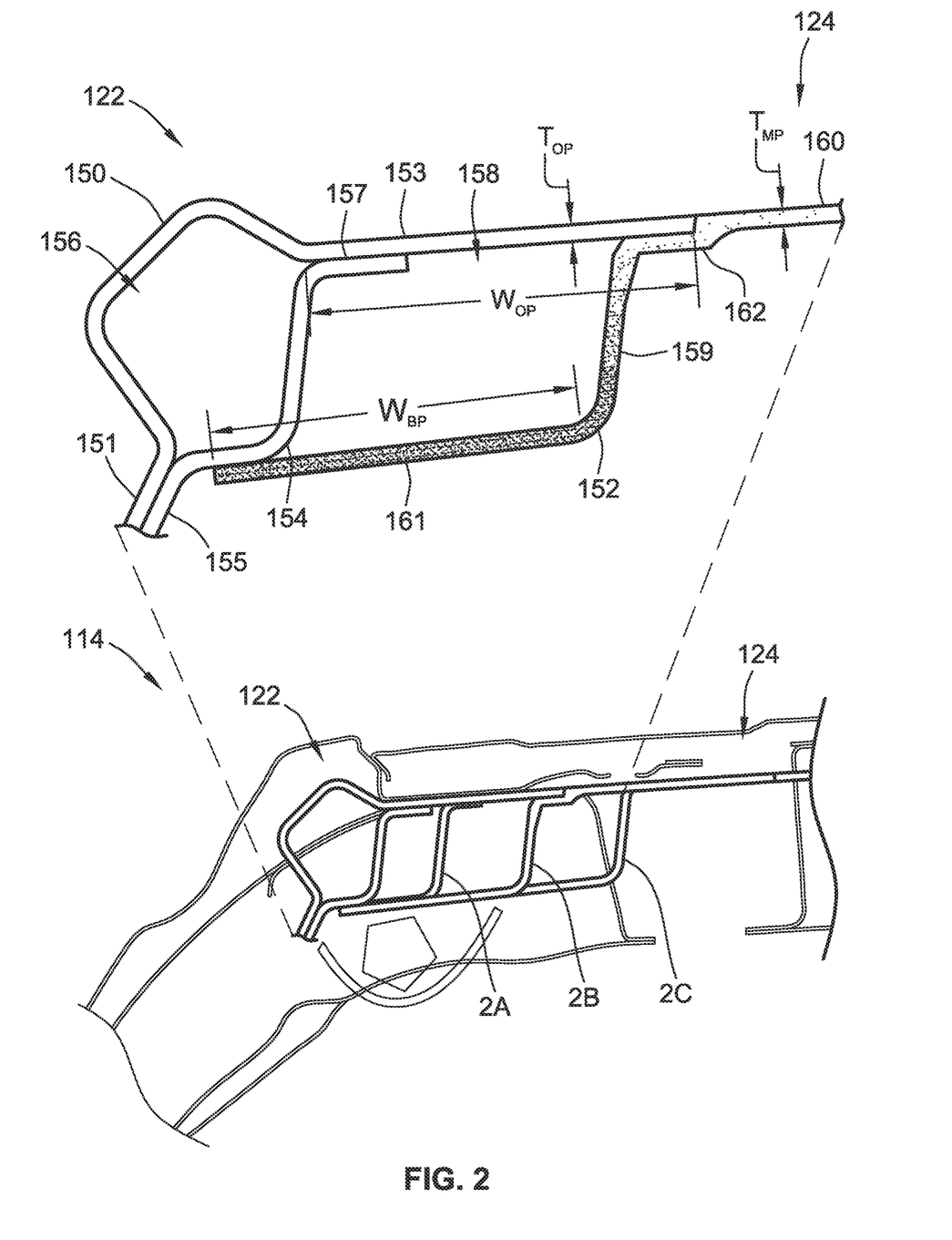
FIG. 2 is an end-view illustration of a representative FRP-composite vehicle roof rail-and-panel structure with three overlapping cross-sections taken along lines 2A-2A, 2B-2B and 2C-2C in the inset view of FIG. 1.
Figure 3:
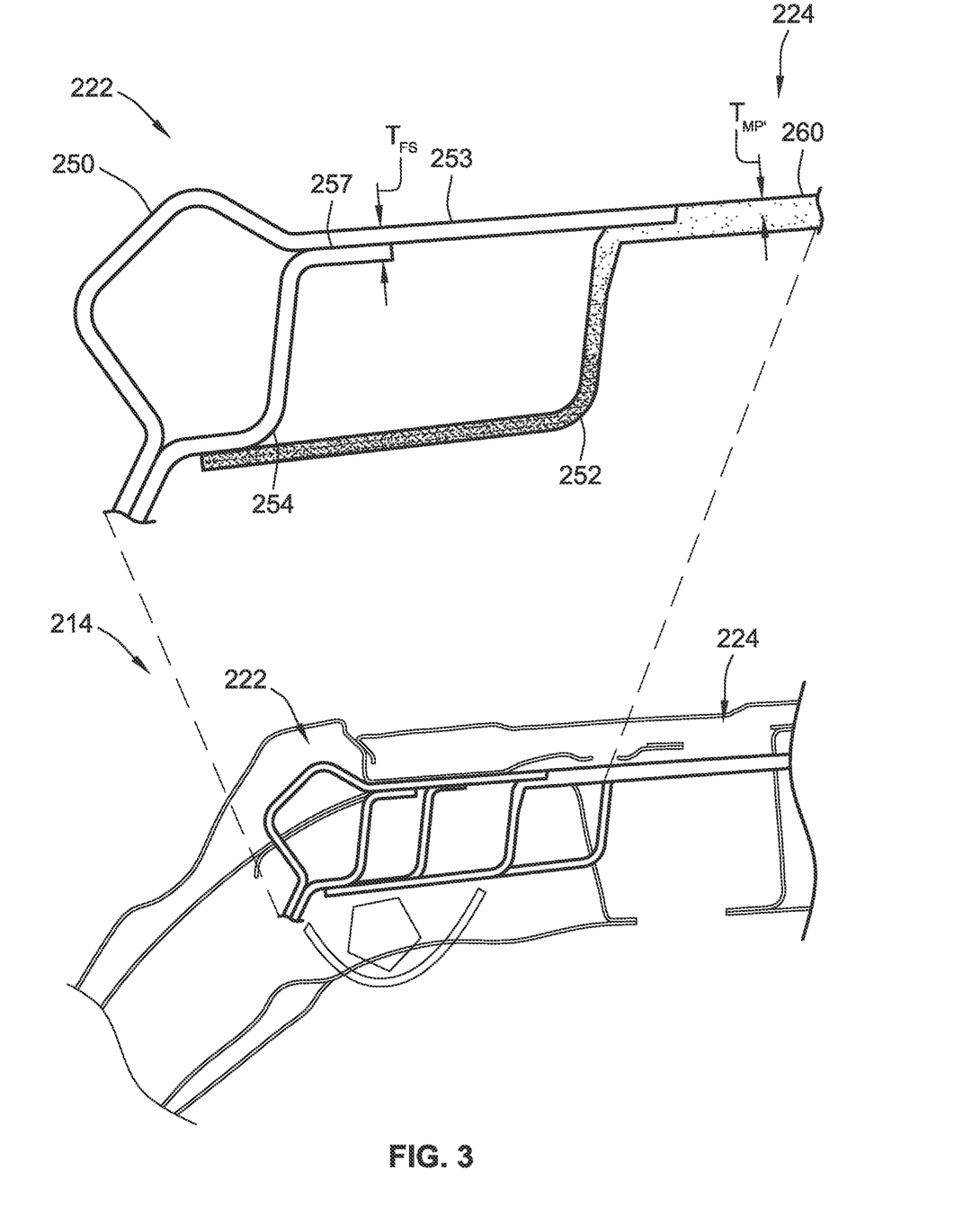
FIG. 3 is an end-view illustration of another representative FRP-composite vehicle roof rail-and-panel structure in accord with aspects of the disclosed concepts.
Figure 4:
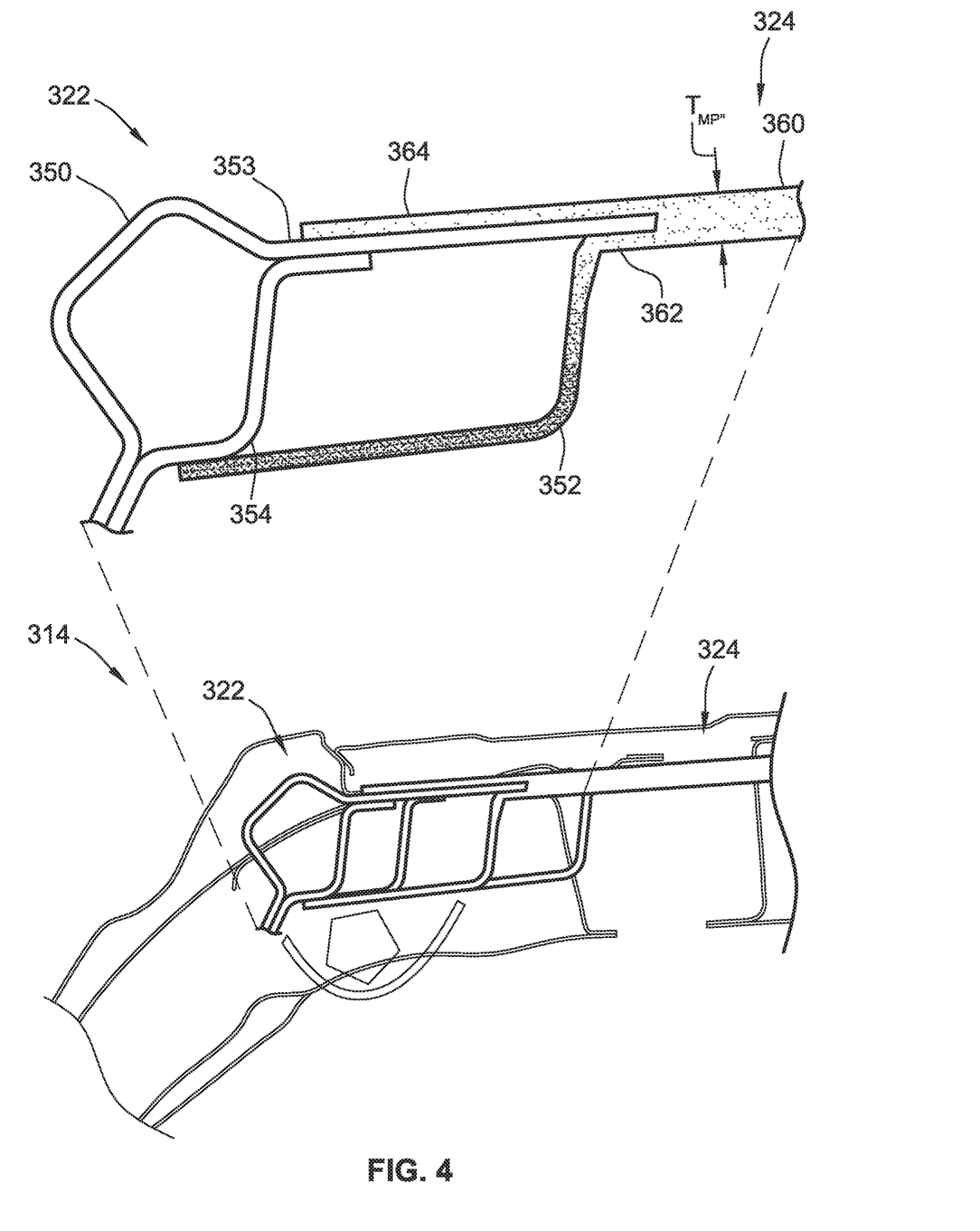
FIG. 4 is an end-view illustration of yet another representative FRP-composite vehicle roof rail-and-panel structure in accord with aspects of the disclosed concepts.

Roof structures 114, 214, 314 have variable transverse cross-sectional geometries that change along the fore-aft length of the structure. To illustrate this variable geometry, the primary views in FIGS. 2-4 present three overlapping cross-sections of the FRP-composite roof rail-and-panel structure 114—labelled 2A, 2B and 2C in FIG. 2—as if taken along lines 2A-2A, 2B-2B and 2C-2C in the inset view of FIG. 1. For simplicity in describing the constituent parts of the representative roof structures, however, the enlarged views within FIGS. 2-4 are cross-sectional, end-view illustrations of the FRP-composite roof rail-and-panel structures 114, 214, 314 at a single location, namely along line 2C-2C of FIG. 1. Driver-side roof rails 122, 222, and 322, for example, are tripartite constructions assembled from three discrete non-flat pieces: an outer contoured panel 150, 250 and 350 (also referred to herein as "first contoured rail panel"); a base contoured panel 152, 252 and 352 (also referred to herein as "second contoured rail panel"); and an inner contoured panel 154, 254 and 354 (also referred to herein as "third contoured rail panel"). When assembled onto a vehicle, such as automobile 10 of FIG. 1: the outer contoured panel 150, 250, 350 is located furthest from a longitudinal centerline of the vehicle, i.e., "outboard" from, both the base and inner contoured panels 152, 252, 352, and 154, 254, 354; the base panel 152, 252, 352 is located inboard from both the outer and inner panels 150, 250, 350 and 154, 254, 354; and the inner panel 154, 254, 354 is sandwiched between the outer and base panels 150, 250, 350 and 154, 254, 354.

Opposing lateral sides of the elongated outer and inner contoured panels 150, 154 are joined together to define therebetween a five-sided (first) internal cavity 156 that extends along the fore-aft length of the vehicle roof structure 114. As shown, the outer contoured panel 150 includes a pair of outwardly projecting (first) flanges 151 and 153, and the inner contoured panel 154 includes a pair of outwardly projecting (second) flanges 155 and 157. The distal flange 151 of the outer contoured panel 150 is mounted to the distal flange 155 of the inner contoured panel 154, whereas the proximal flange 153 of the outer contoured panel 150 is mounted to the proximal flange 157 of the inner contoured panel 154. Likewise, opposing lateral sides of the base contoured panel 152 are joined to the outer and inner contoured panels 150, 154 to define therebetween a four-sided (second) internal cavity 158 neighboring the main internal cavity 156. For instance, the base contoured panel 152 includes an inboard panel segment 159 that mounts thereon the outer panel's proximal flange 153, and an outboard panel segment 161 that projects obliquely from the inboard panel segment 159 and mounts thereon a central body section of the inner contoured panel 154.

Both outer and inner contoured panels 150, 154 may be molded from an FRP composite material, formed from a thermoset or thermoplastic polymer, cut and stamped from a steel or aluminum sheet metal, or fabricated from other suitably rigid materials and processes. Conversely, the base contoured panel 152 is formed from an FRP material, such as a thermoset CFRP. It may be desirable, for at least some implementations, that all three contoured rail panels be formed from the same material. Although depicted as a three-piece construction, vehicle roof structure 114, 214, 314 may be manufactured with greater or fewer pieces with similar or distinct geometries from that which are shown in the Figures. Joining of the rail panel pieces may be achieved by way of adhesives or fasteners.

Extending transversely in a cross-car direction between the driver-side and passenger-side roof rails 122, 222, 322 is a roof panel 124, 224, 324 formed, in whole or in part, from the same FRP material used to fabricate at least the base contoured panel 152, 252, 352. In accord with the illustrated example, the roof panel 124 of FIG. 2 is formed with a curved main panel section 160 and a pair of stepped interfaces 162 projecting transversely from opposing lateral sides of the main panel section 160. Once installed on a vehicle, the main panel section 160 may span approximately the entire fore-aft length and approximately the entire cross-car width of the vehicle's roof. At the same time, the stepped interfaces 162 of FIG. 2 (only one visible; mirrored counterpart provided for driver-side rail) is partially hidden underneath the outer rail panel 150. Although both continuous and discontinuous configurations are appropriate, the stepped interfaces 162 of FIG. 2 may extend continuously along the entire fore-aft length of the roof rail's side edges (e.g., roof rail length $L_{RR}$ of FIG. 1). As the name implies, each stepped interface 162 is composed of a multilevel sequence of steps; the proximal flange 153 of the outer panel 150 is mounted onto one step of the stepped interface 162. In so doing, an uppermost surface of the outer rail panel's flange 153 is substantially flush with an uppermost surface of the rail panel's main section 160.

To reduce system complexity and simplify vehicle assembly, each body panel is integrally formed with one or more rail panels as a single-piece, unitary structure. In a non-limiting example, each roof panel 124, 224, 324 is integrally formed with two of the base rail panels 152, one from each roof rail 122. With reference again to FIG. 2, the base contoured panel 152 is shown connected to the main panel section 160 via the stepped interface 162, projecting at an oblique angle from the roof panel 124 in a stepped fashion. In addition, the outboard panel segment 161 of the base contoured panel 152 may be generally parallel to the proximal flange 153 of the outer contoured panel 150 and that portion of the main panel section 160 immediately adjacent the stepped interface 162.

As seen in FIG. 2, a roof panel thickness $T_{MP}$ of the roof panel's main panel section 160 is substantially equal to a rail panel thickness $T_{OP}$ of the outer contoured panel 162 (e.g., $T_{MP} \approx T_{OP} \approx 2$ mm to 6 mm). As another option, a roof panel thickness $T_{MP'}$ of the main panel section 260 of roof panel 224 of FIG. 3 is greater than the thickness $T_{OP}$ (FIG. 2) of outer rail panel 250 and approximately equal to a total thickness $T_{FS}$ of the mating pair of flanges 253, 257 stacked against and attached to each other (e.g., $T_{OP} \approx 2$ mm to 4 mm; $T_{MP'} \approx T_{FS} \approx 6$ mm to 10 mm). FIG. 4, on the other hand, illustrates a main panel section 360 of a roof panel 324 with a roof panel thickness $T_{MP''}$ that is greater than the total thickness $T_{FS}$ (FIG. 3) of the mating pair of flanges. As a further option, the roof panel 324 is formed with a pair of elongated overhang sections 364 that project transversely from opposing lateral sides of the main panel section 360. Each overhang section 364 may extend continuously along the entire fore-aft length of its respective side edge (e.g., roof rail length $L_{RR}$ of FIG. 1). In this instance, a proximal flange 353 of the outer contoured rail panel 350 rigidly mounts to the roof panel 324, sandwiched between the stepped interface 362 and the overhang section 364.

The optical transparency of the vehicle roof structures 114, 214, 314 may be selectively varied from section to section. For instance, both the outer and inner rail panels 150 and 154 of FIG. 2, for example, may be substantially opaque, allowing little or no light to pass therethrough. In the same vein, the outboard panel segment 161 of the base contoured panel 152 may also be substantially opaque. On the other hand, it is envisioned that any one or more of all of the roof rail panels 150, 152, 154 may be transparent or translucent. Conversely, the main panel section 160 of the roof panel 124 may be substantially transparent, providing at least approximately 90-100% total transmittance. As shown with dot shading in FIG. 2, the stepped interface 162 and the inboard panel segment 159 of base contoured panel 152 have variable opacities that change in a transverse direction along a lateral width of the body panel. In the illustrated example, the outboard panel segment 161 is substantially opaque, the inboard panel segment 159 transitions (e.g., in a left-to-right direction in FIG. 2) from substantially opaque to translucent, the stepped interface 162 transitions (e.g., in a left-to-right direction in FIG. 2) from translucent to predominantly transparent, and the main panel section 160 is transparent. It should be appreciated that the level of transparency of each rail and panel section may be selected, for example, to accommodate the design constraints of the intended application of the roof structure. For instance, both the main panel section 160 and the contoured panel 152 may have substantially the same level of transparency (e.g., about 2% to 20% total transmittance).

To help improve transverse and vertical loading on a vehicle roof structure, such as vehicle roof 14 of FIG. 1, the dimensional characteristics of select segments of the FRP-composite roof rail-and-panel structures 114, 214, 314 may change in the fore-aft, cross-car and/or vertical directions of the automobile 10. For instance, a lateral width $W_{BP}$ of the outboard panel segment 161 of the base rail panel 152 varies (e.g., increases and decreases) along the fore-aft length of the vehicle body, e.g., as indicated by the three overlapping cross-sectional views 2A-2C in FIG. 2. Likewise, the proximal flange 153 of the outer contoured rail panel 150 has a lateral width $W_{OP}$ that varies (e.g., increases and decreases commensurate with the changes of the width $W_{BP}$) along the fore-aft length of the vehicle body structure 114, e.g., as indicated by the overlapping cross-sectional views 2A-2C.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A vehicle body structure for a motor vehicle, the vehicle body structure comprising:
   a first elongated support rail including a first contoured rail panel joined to a second contoured rail panel to define therebetween an internal rail cavity, the second contoured rail panel formed with a fiber-reinforced polymer (FRP) material; and
   a body panel formed with the FRP material and including a main panel section having a first stepped interface projecting transversely from a first side edge of the main panel section and mounting thereon the first contoured rail panel, wherein the body panel and the second contoured rail panel are integrally formed as a single-piece unitary structure.

2. The vehicle body structure of claim 1, wherein the elongated support rail further includes a third contoured rail panel sandwiched between and attached to the first and second contoured rail panels.

3. The vehicle body structure of claim 2, wherein the first contoured rail panel includes a pair of outwardly projecting first flanges, and the third contoured rail panel includes a pair of outwardly projecting second flanges each mounted to a respective one of the first flanges.

4. The vehicle body structure of claim 3, wherein the second contoured rail panel includes an inboard panel segment projecting obliquely from an outboard panel segment, the inboard panel segment integrally formed with the stepped interface, and the outboard panel segment mounting thereon the third contoured rail panel.

5. The vehicle body structure of claim 3, wherein the first and third contoured rail panels are formed with a metallic material.

6. The vehicle body structure of claim 3, wherein a thickness of the main panel section is equal to or greater than a total thickness of a mating pair of the first and second flanges stacked against and mounted to each other.

7. The vehicle body structure of claim 1, wherein the side edge of the main panel section has a fore-aft length, the stepped interface extending continuously along an entirety of the fore-aft length of the side edge.

8. The vehicle body structure of claim 1, wherein an upper surface of the first contoured rail panel is substantially flush with an upper surface of the main panel section of the body panel.

9. The vehicle body structure of claim 1, wherein a thickness of the main panel section is substantially equal to a thickness of the first contoured rail panel.

10. The vehicle body structure of claim 1, wherein the body panel further includes an overhang section projecting transversely from the main panel section, and wherein a first flange of the first contoured rail panel mounted onto the body panel is sandwiched between the stepped interface and the overhang section.

11. The vehicle body structure of claim 1, wherein the second contoured rail panel includes an inboard panel segment projecting obliquely from an outboard panel segment, the inboard panel segment integrally formed with the stepped interface, and a lateral width of the outboard panel segment varying along a fore-aft length of the vehicle body structure.

12. The vehicle body structure of claim 11, wherein a first flange of the first contoured rail panel is mounted onto the stepped interface of the body panel, a lateral width of the first flange varying along the fore-aft length of the vehicle body structure.

13. The vehicle body structure of claim 1, further comprising a second elongated support rail with third and fourth contoured rail panels, the fourth contoured rail panel formed with the FRP material, wherein the body panel further includes a second stepped interface projecting transversely from a second side edge of the main panel section opposite that of the first side edge, the second stepped interface mounting thereon the third contoured rail panel, and the body panel and the fourth contoured rail panel being integrally formed as the single-piece unitary structure.

14. The vehicle body structure of claim 1, wherein the first stepped interface has a variable opacity changing in a transverse direction along a lateral width of the body panel.

15. A motor vehicle comprising:
a vehicle body with an upper body structure adjoining a lower body structure; and
a prime mover mounted on the vehicle body and operable to propel the motor vehicle, wherein the upper body structure includes:
a plurality of support pillars attached to and projecting upward from the lower body structure;
a first roof rail mounted onto a first set of the support pillars and including first and second contoured rail panels joined together to define therebetween a first internal rail cavity, the second contoured rail panel formed with a fiber-reinforced polymer (FRP) material;
a second roof rail laterally spaced from the first roof rail and mounted onto a second set of the support pillars, the second roof rail including third and fourth contoured rail panels joined together to define therebetween a second internal rail cavity, the fourth contoured rail panel formed with the FRP material; and
a body panel formed with the FRP material and including a main panel section having first and second stepped interfaces projecting transversely from opposing first and second side edges, respectively, of the main panel section, the first and second stepped interfaces mounting thereon the first and third contoured rail panels, respectively, wherein the body panel and the second and fourth contoured rail panels are integrally formed as a single-piece unitary structure.

16. A method of manufacturing a vehicle body structure for a motor vehicle, the method comprising:
forming a first contoured rail panel of a first elongated support rail;
forming a second contoured rail panel of the first elongated support rail with a fiber-reinforced polymer (FRP) material;
joining the first and second contoured rail panels together to define therebetween an internal rail cavity;
forming a body panel with the FRP material, the body panel including a main panel section having a first stepped interface projecting transversely from a first side edge of the main panel section, wherein the body panel and the second contoured rail panel are integrally formed together as a single-piece unitary structure; and
mounting the first contoured rail panel onto the first stepped interface.

17. The method of claim 16, further comprising:
locating a third contoured rail panel of the elongated support rail between the first and second contoured rail panels; and
attaching the third contoured rail panel to the first and second contoured rail panels.

18. The method of claim 17, wherein the first contoured rail panel includes a pair of outwardly projecting first flanges, and the third contoured rail panel includes a pair of outwardly projecting second flanges each mounted to a respective one of the first flanges.

19. The method of claim 16, wherein an upper surface of the first contoured rail panel is substantially flush with an upper surface of the main panel section of the body panel.

20. The method of claim 16, wherein a thickness of the main panel section is equal to or greater than a thickness of the first contoured rail panel.

* * * * *